United States Patent
Galliano, III et al.

(10) Patent No.: US 11,544,662 B2
(45) Date of Patent: Jan. 3, 2023

(54) AUTONOMOUS VEHICLE DELIVERY MONITORING

(71) Applicant: GM Cruise Holdings LLC, San Francisco, CA (US)

(72) Inventors: Anthony Galliano, III, Seattle, WA (US); Arun A. Mathews, Newcastle, WA (US); Charlotte Blanc, Seattle, WA (US); Pratik Palnitkar, Klirkland, WA (US); Timothy Jon Meador, Fairfield, CA (US)

(73) Assignee: GM Cruise Holdings LLC, San Francisco, CA (US)

( * ) Notice: Subject to any disclaimer, the term of this patent is extended or adjusted under 35 U.S.C. 154(b) by 87 days.

(21) Appl. No.: 16/727,821

(22) Filed: Dec. 26, 2019

(65) Prior Publication Data

US 2021/0201264 A1 Jul. 1, 2021

(51) Int. Cl.
*G06Q 10/08* (2012.01)
*G06Q 50/28* (2012.01)
*G05D 1/00* (2006.01)

(52) U.S. Cl.
CPC ..... *G06Q 10/08355* (2013.01); *G05D 1/0027* (2013.01); *G06Q 10/0833* (2013.01); *G06Q 50/28* (2013.01)

(58) Field of Classification Search
CPC ......... G06Q 10/08355; G06Q 10/0833; G06Q 50/28; G05D 1/0027
See application file for complete search history.

(56) References Cited

U.S. PATENT DOCUMENTS

| | | | |
|---|---|---|---|
| 2013/0309637 A1* | 11/2013 | Minvielle | G09B 19/0092 434/430 |
| 2015/0006005 A1* | 1/2015 | Yu | G06Q 50/28 701/22 |
| 2018/0024554 A1* | 1/2018 | Brady | G06Q 10/0833 701/23 |
| 2018/0181909 A1* | 6/2018 | Wilkinson | G06V 20/40 |
| 2019/0233208 A1* | 8/2019 | Nikolich | G06Q 50/28 |
| 2019/0265703 A1* | 8/2019 | Hicok | G05D 1/0242 |
| 2020/0257912 A1* | 8/2020 | Qiu | G06V 10/40 |

* cited by examiner

*Primary Examiner* — Daniel Vetter
*Assistant Examiner* — Christopher Gomez
(74) *Attorney, Agent, or Firm* — Akona IP PC

(57) ABSTRACT

Systems and methods are provided for monitoring deliveries in an autonomous vehicle. In particular, systems and methods are provided for monitoring the conditions of the interior of a delivery container inside an autonomous vehicle. In various implementations, the delivery container includes one or more compartments, and the conditions of each of the one or more compartments is monitored.

20 Claims, 6 Drawing Sheets

AUTONOMOUS VEHICLE DELIVERY MONITORING

FIELD OF THE DISCLOSURE

The present disclosure relates generally to autonomous vehicles (AVs) and to systems and methods for autonomous vehicle delivery of goods.

BACKGROUND

Autonomous vehicles, also known as self-driving cars, driverless vehicles, and robotic vehicles, are vehicles that use multiple sensors to sense the environment and move without human input. Automation technology in the autonomous vehicles enables the vehicles to drive on roadways and to accurately and quickly perceive the vehicle's environment, including obstacles, signs, and traffic lights. The vehicles can be used to pick up passengers and drive the passengers to selected destinations. The vehicles can also be used to pick up packages and/or other goods and deliver the packages and/or goods to selected destinations.

SUMMARY

Systems and methods are provided for monitoring deliveries in an autonomous vehicle. In particular, systems and methods are provided for monitoring the conditions of the interior of a delivery container inside an autonomous vehicle. In various implementations, the delivery container includes one or more compartments, and the conditions of each of the one or more compartments is monitored.

According to one aspect, a method is provided method for monitoring packages in autonomous vehicle delivery, including picking up a package in an autonomous vehicle delivery container, determining, by a first plurality of sensors, a configuration of the AV delivery container, determining, by a second plurality of sensors, a set of attributes for the package, monitoring the package to detect whether a change occurs in at least one of the set of attributes, and transporting the package to a drop-off location.

In some implementations, the method includes transmitting the set of attributes to a central computer. In some implementations, transmitting the set of attributes to a central computer includes transmitting a livestream of the set of attributes.

In some implementations, the method includes transmitting the set of attributes to a user. In some implementations, the set of attributes includes at least one of dimensions, weight, temperature, and appearance. In some implementations, the method includes adjusting a delivery container setting based on the change detected in monitoring the package.

In some implementations, the method includes receiving a package delivery request from a peer-to-peer delivery system. In some implementations, the method includes providing a streaming video of the package to a central computer. In some implementations, the method includes identifying goods in the package based, at least in part, on the set of attributes.

According to one aspect, a system for monitoring in autonomous vehicle delivery includes a plurality of autonomous vehicles each having a respective delivery container, and a remote computing system configured to receive a package delivery request and select an autonomous vehicle from the plurality of autonomous vehicles to fulfill the package delivery request. Each of the plurality of autonomous vehicles includes a respective delivery container having a plurality of sensors and is configured to determine, by the plurality of sensors, a configuration of the respective delivery container, determine, by the plurality of sensors, a set of attributes for the package, and monitor the package to detect whether a change occurs in at least one of the set of attributes.

In some implementations, the configuration determined by first plurality of sensors includes a number of compartments in the respective delivery container. In some implementations, the plurality of sensors includes at least one of a temperature sensor, a liquid sensor, and an image sensor. In some implementations, each of the plurality of autonomous vehicles is configured to transmit the set of attributes to the remote computing system. In some implementations, the plurality of sensors includes an image sensor and the set of attributes includes a video of the package. In some implementations, the plurality of sensors includes an image sensor and the set of attributes includes a video of the interior of the delivery container.

According to one aspect, an autonomous vehicle delivery system includes a delivery container configured to hold a package, a plurality of sensors positioned in the delivery container for detecting a set of attributes for the package, a transceiver for receiving the set of attributes from the plurality of sensors and for transmitting the set of attributes, and a processor for detecting changes in the set of attributes over time.

In some implementations, the set of sensors includes at least one of a temperature sensor, a liquid sensor, and an image sensor. In some implementations, the set of attributes includes a video of an interior of the delivery container. In some implementations, the set of attributes includes at least one of dimensions, weight, temperature, and appearance. In some implementations, the plurality of sensors determines a configuration of the delivery container. In some implementations, the set of attributes are transmitted to a remote computer system.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION

Figure 1:
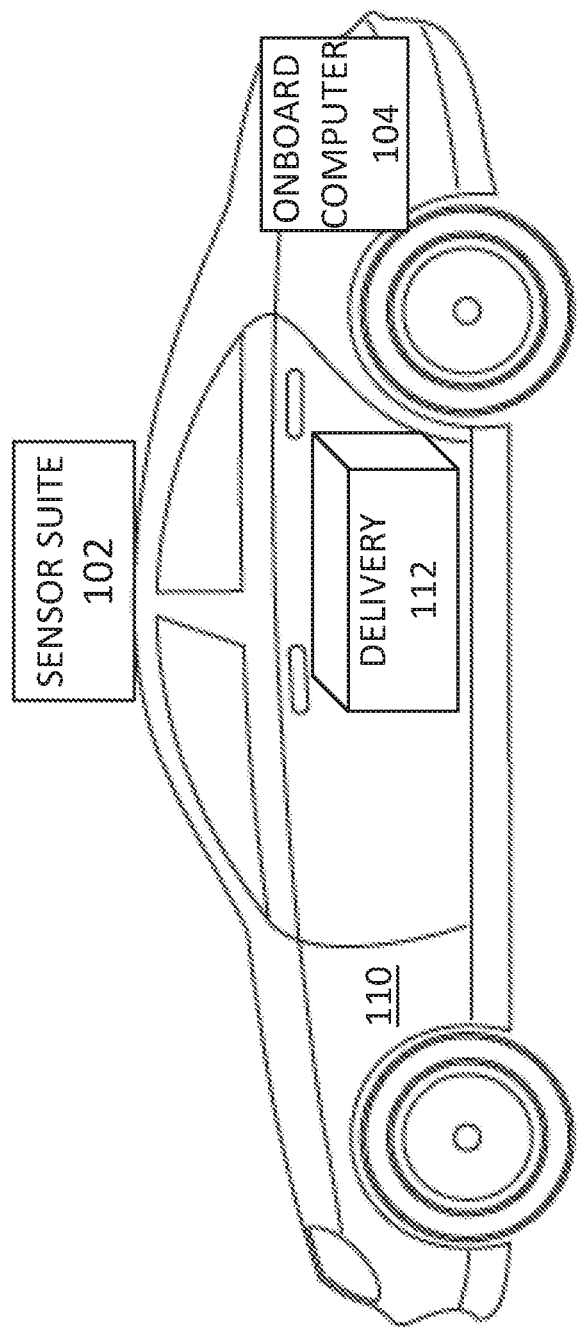
FIG. 1 is a diagram illustrating an autonomous vehicle, according to some embodiments of the disclosure.

Systems and methods are provided for monitoring deliveries in an autonomous vehicle. In particular, systems and methods are provided for monitoring the conditions of the interior of a delivery container inside an autonomous vehicle. In various implementations, the delivery container includes one or more compartments, and the conditions of each of the one or more compartments is monitored.

In various implementations, the container inside the autonomous vehicle is used for delivering goods. The goods placed in the container, to be delivered by the autonomous vehicle, can be monitored electronically and/or by a user. For example, food deliveries can be monitored for temperature, spills, and smells. In some examples, the monitored conditions can be regulated. In one example, temperature can be adjusted. In another examples, the container can be ventilated. In a further example, the container can be drained. In one example, a container can be flagged for cleaning if a spill is detected. Additionally, a video of the goods can be recorded. In some examples, a livestream video is accessible to a user.

In various implementations, the container inside the autonomous vehicle is used in a peer-to-peer delivery system. Sensors inside the delivery container can be used to determine the nature of the goods placed in the delivery container.

In various implementations, sensors are used to monitor the temperature of one or more compartments in the container. In some examples, sensor data in the compartment is used as inputs and/or feedback to cooling, heating, and/or ventilation systems, to regulate the temperature and air in the compartment.

In some implementations, a removable box is positioned in the back seat, and the removable box is the delivery container. In various examples, the box includes multiple compartments. In some examples, the box includes mobile dividers that can be used to customize the size of one or more compartments inside the box. Each compartment in the box includes a set of sensors, and the conditions in each compartment can be customized for each compartment. In one example, the delivery container includes one compartment set to cool and a second compartment set to heat.

In various implementations, the AV can be converted from passenger use to cargo/delivery use and back again. The temperature regulation system is designed to function in both the cargo/delivery mode and the passenger mode.

Various examples of the present technology are discussed in detail below. While specific implementations are discussed, it should be understood that this is done for illustration purposes only. A person skilled in the relevant art will recognize that other components and configurations may be used without parting from the spirit and scope of the present technology. In some instances, well-known structures and devices are shown in block diagram form in order to facilitate describing one or more aspects. Further, it is to be understood that functionality that is described as being carried out by certain system components may be performed by more or fewer components than shown.

FIG. 1 is a diagram 100 illustrating an autonomous vehicle 110, according to some embodiments of the disclosure. The autonomous vehicle 110 includes a sensor suite 102, an onboard computer 104, and a delivery container 112. In various examples, package and/or goods are placed in the delivery container for delivery by the autonomous vehicle 110. In various implementations, the autonomous vehicle 110 uses sensor information from the sensor suite 102 to determine its location, to navigate traffic, and to sense and avoid various obstacles.

The sensor suite 102 includes localization and driving sensors. For example, the sensor suite may include one or more of photodetectors, cameras, RADAR, SONAR, LIDAR, GPS, inertial measurement units (IMUs), accelerometers, microphones, strain gauges, pressure monitors, barometers, thermometers, altimeters, wheel speed sensors, and a computer vision system.

In various examples, the sensor suite 102 includes cameras implemented using high-resolution imagers with fixed mounting and field of view. In further examples, the sensor suite 102 includes LIDARs implemented using scanning LIDARs. Scanning LIDARs have a dynamically configurable field of view that provides a point-cloud of the region intended to scan. In still further examples, the sensor suite 102 includes RADARs implemented using scanning RADARs with dynamically configurable field of view.

The autonomous vehicle 110 includes an onboard computer 104, which functions to control the autonomous vehicle 110. The onboard computer 104 processes sensed data from the sensor suite 102 and/or other sensors, in order to determine a state of the autonomous vehicle 110. In some implementations described herein, the autonomous vehicle 110 includes sensors inside the vehicle. Based upon the vehicle state and programmed instructions, the onboard computer 104 controls and/or modifies driving behavior of the autonomous vehicle 110.

The onboard computer 104 functions to control the operations and functionality of the autonomous vehicles 110 and processes sensed data from the sensor suite 102 and/or other sensors in order to determine states of the autonomous vehicles no. In some implementations, the onboard computer 104 is a general-purpose computer adapted for I/O communication with vehicle control systems and sensor systems. In some implementations, the onboard computer 104 is any suitable computing device. In some implementations, the onboard computer 104 is connected to the Internet via a wireless connection (e.g., via a cellular data connection). In some examples, the onboard computer 104 is coupled to any number of wireless or wired communication systems. In some examples, the onboard computer 104 is coupled to one or more communication systems via a mesh network of devices, such as a mesh network formed by autonomous vehicles.

According to various implementations, the autonomous driving system 100 of FIG. 1 functions to enable an autonomous vehicle 110 to modify and/or set a driving behavior in response to parameters set by vehicle passengers (e.g., via a passenger interface) and/or other interested parties (e.g., via a vehicle coordinator or a remote expert interface). Driving behavior of an autonomous vehicle may be modified according to explicit input or feedback (e.g., a passenger specifying a maximum speed or a relative comfort level), implicit input or feedback (e.g., a passenger's heart rate), or any other suitable data or manner of communicating driving behavior preferences. Sensor data from a delivery container can be used to modify driving behavior. For example, sensor data may indicate the presence of a liquid in the delivery container, and driving behavior may be modified to prevent spillage of the liquid.

The autonomous vehicle 110 is preferably a fully autonomous automobile, but may additionally or alternatively be any semi-autonomous or fully autonomous vehicle. In various examples, the autonomous vehicle 110 is a boat, an unmanned aerial vehicle, a driverless car, a golf cart, a truck, a van, a recreational vehicle, a train, a tram, a three-wheeled vehicle, or a scooter. Additionally, or alternatively, the autonomous vehicles may be vehicles that switch between a semi-autonomous state and a fully autonomous state and thus, some autonomous vehicles may have attributes of both a semi-autonomous vehicle and a fully autonomous vehicle depending on the state of the vehicle.

In various implementations, the autonomous vehicle 110 includes a throttle interface that controls an engine throttle, motor speed (e.g., rotational speed of electric motor), or any other movement-enabling mechanism. In various implementations, the autonomous vehicle 110 includes a brake interface that controls brakes of the autonomous vehicle 110 and controls any other movement-retarding mechanism of the autonomous vehicle 110. In various implementations, the autonomous vehicle 110 includes a steering interface that controls steering of the autonomous vehicle 110. In one example, the steering interface changes the angle of wheels of the autonomous vehicle. The autonomous vehicle 110 may additionally or alternatively include interfaces for control of any other vehicle functions, for example, windshield wipers, headlights, turn indicators, air conditioning, etc.

Figure 2:
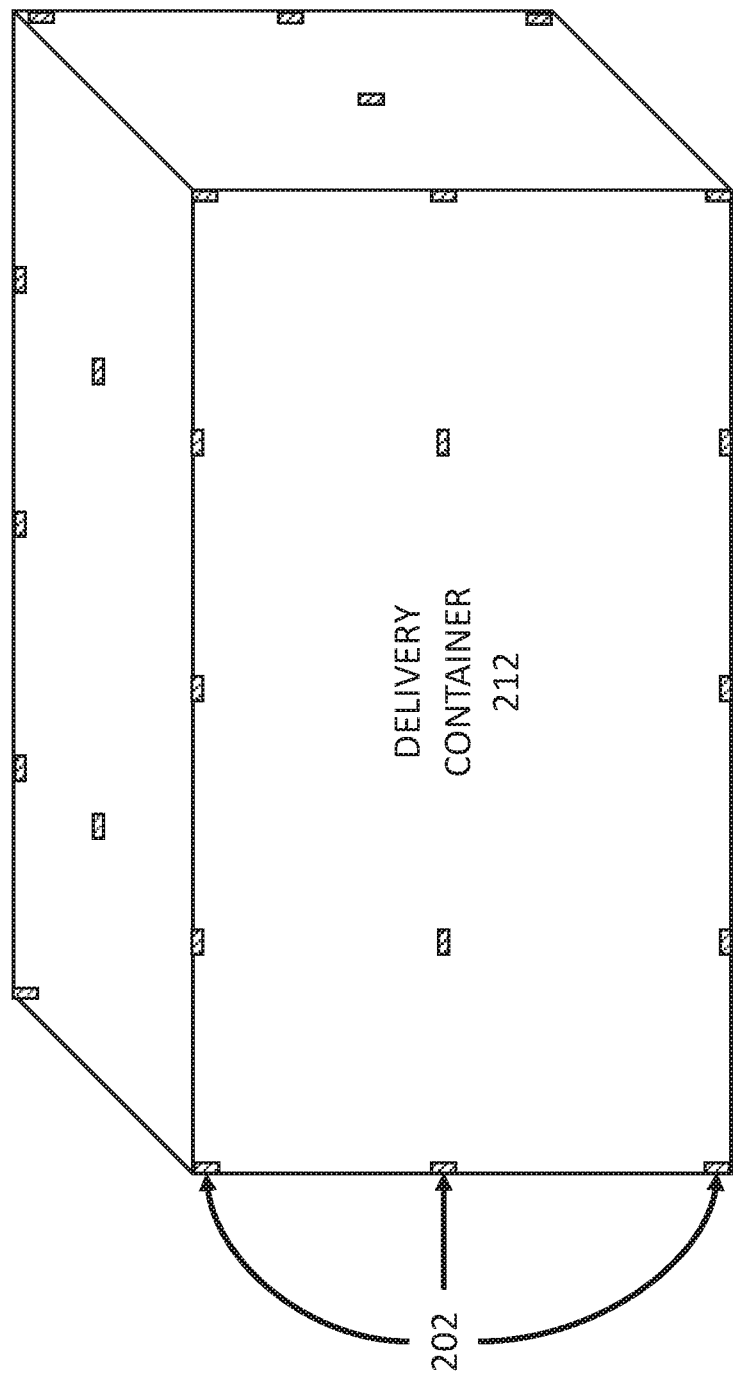
FIG. 2 is a diagram illustrating a delivery container including multiple sensors, according to some embodiments of the disclosure.

FIG. 2 is a diagram illustrating a delivery container 212 including multiple sensors 202, according to various embodiments of the disclosure. The delivery container 212 is configured to fit inside an autonomous vehicle, and can include any selected number of sensors. The delivery container 212 includes multiple sensors 202 on each interior edge of the delivery container 212, as well as sensors 202 on interior sides of the delivery container 212. The sensors 202 can be positioned at any selected location within the delivery container 212. In some examples, one or more of the sensors 202 are positioned on the outside of the delivery container 212. In various implementations, the delivery container 212 includes any selected number of sensors.

The sensors 202 communicate sensed data with a computer. In some examples, the sensors 202 communicate sensed data with an onboard computer on the autonomous vehicle, such as with the onboard computer 104 in the autonomous vehicle 110 in FIG. 1. In some examples, the delivery container 112 includes a separate computer connected to the sensors 202, for receiving, storing, and transmitting the sensor data. In some examples, the delivery container computer also processes the sensors data. In some examples, the delivery container 112 includes a transceiver for receiving and transmitting the sensor data to another computer, for example an autonomous vehicle onboard computer.

In various implementations, the sensors 202 communicate sensor data wirelessly. The sensors 202 can communicate via any selected connection technology. In some examples, one or more of the sensors 202 transmit and/or receive data via a wireless personal area network, such as a Bluetooth connection or an infrared light connection. In some examples, one or more of the sensors 202 transmit and/or receive data via one of a wireless local area network (WLAN), a wireless ad hoc network, and a wireless mesh network. In some examples, one or more of the sensors 202 transmit and/or receive data via one or more of a radio network, a mobile network, and a cellular network. In some implementations, one or more of the sensors 202 communicate sensor data via a wired connection.

The sensors 202 can include any type of sensor. The sensors 202 are designed to detect and measure environmental conditions. The sensors 202 also detect changes in environmental conditions. In various examples, the sensors 202 include one or more of a temperature sensor, a weight sensor, an image sensor, a chemical sensor, a photoelectric sensor, and a force-sensing resistor sensor. In some examples, the sensors 202 includes one or more of a liquid sensor, and a spill sensor. In some examples, the sensors 202 include a smell sensor. In various examples, one or more of the sensors 202 is a micro-electromechanical system (MEMS) sensor.

The sensors 202 may include one or more temperature sensors. In some examples, one or more temperature sensors is included in the interior of the delivery container 212 to measure the internal temperature of the delivery container 212. In some examples, one or more temperature sensors is positioned in the interior of the delivery container 212 to measure and monitor the temperature of the package or goods placed in the delivery container 212. In some examples, the package or goods may include a perishable item, and the temperature sensor can be used to monitor and/or regulate the temperature of the delivery container 212. In some examples, one or more temperature sensors is positioned on the exterior of the delivery container 212 to measure the temperature outside the delivery container 212. In some examples, one or more temperature sensors are one of a contact temperature sensor and a non-contact temperature sensor. Various examples of temperature sensors include a thermistor, a negative temperature coefficient thermistor, and a resistance temperature detector.

The sensors may include one or more weight sensors positioned on the bottom on the delivery container 212. One or more weight sensor can be used to detect the presence of a package, as well as to determine the position of the package in the delivery container 212. In some examples, the weight sensors include one or more of a load cell, a transducer, and a force sensor.

The sensors 202 may include one or more image sensors positioned inside the delivery container 212. In some examples, one or more image sensors provide a continuous recording of the package or goods inside the delivery container 212. In some examples, one or more image sensors take periodic snapshots of the package or goods inside the delivery container 212. In one example, an image sensor captures an image of the package inside the delivery container 212 every 10 seconds. In various examples, the image sensors include one or more of a charge-coupled device (CCD) and an active-pixel sensor (complementary metal oxide semiconductor sensor).

In some implementations, one or more image sensors is configured to capture an image of the inside of the package. In one example, one or more image sensors is configured to x-ray the package. In various examples, one or more image sensors is a flat-panel detector.

The sensors 202 may include one or more chemical sensors positioned inside the delivery container 212. A chemical sensor provides information about the chemical composition of its environment. In some examples, one or more chemical sensors are positioned on the bottom of the delivery container 212 and liquid or other solid substances on the bottom of the delivery container 212. Thus, chemical sensors can be used to detect a spill from the package.

The sensors 202 may include one or more photoelectric sensors positioned inside the delivery container 212. A photoelectric sensor provides information about the presence and position of a package inside the delivery container 212. A photoelectric sensor uses a light transmitter and a photoelectric receiver. The light emitted from the light transmitter can be infrared light. In some examples, one or more photoelectric sensors are positioned on the bottom of a delivery container 212 and sense the placement of a package over the photoelectric sensor. In some examples, one or more photoelectric sensors are positioned on one or more sides of the delivery container 212 and sense the size and position of a package in the delivery container 212.

According to some implementations, the delivery container 212 can be heated or cooled to achieve and/or maintain a target temperature. In some examples, the heating and/or cooling of the delivery container 212 is controlled by a thermal management system, and the sensors 202 communicate sensor data to the thermal management system. The thermal management system heats and/or cools the delivery container 212 based at least in part on the feedback from the sensors 202. In some examples, a central dispatch, such as a central computer or a remote computing system, sends instructions to the thermal management system including a target temperature for the delivery container 212. In some examples, a central dispatch, such as a central computer or a remote computing system, sends target temperature instructions to an autonomous vehicle onboard computer, and the onboard computer communicates the instructions to a thermal management system.

In some examples, the target temperature for the delivery container 212 changes during transportation of the package, and in some examples, the temperature of the delivery container 212 is adjusted to coordinate with drop-off of the package. For example, a warm prepared food delivery package can be heated a few minutes before delivery so that it arrives warm. The warm prepared food delivery package can be kept warm during transport, and then provided extra heat shortly before delivery. Similarly, a cold prepared food delivery package can be chilled a few minutes before delivery so that it arrives cool. The cold prepared food delivery package can be kept cool during transport, and then provided extra cooling shortly before delivery.

In some implementations, systems and methods are provided for detecting the presence of specific classes of objects. Classes of objects may include, for example, weapons and/or narcotics. Some classes of objects may include medicines, drugs, foods, insects, and/or animals. In various examples, the system for detecting classes of objects includes a computer vision system. In some examples, the system for detecting various classes of objects includes ultrasound technology. In some examples, the system for detecting various classes of objects includes x-ray technology. In some examples, the system for detecting various classes of objects includes spectrometry.

Figure 3:
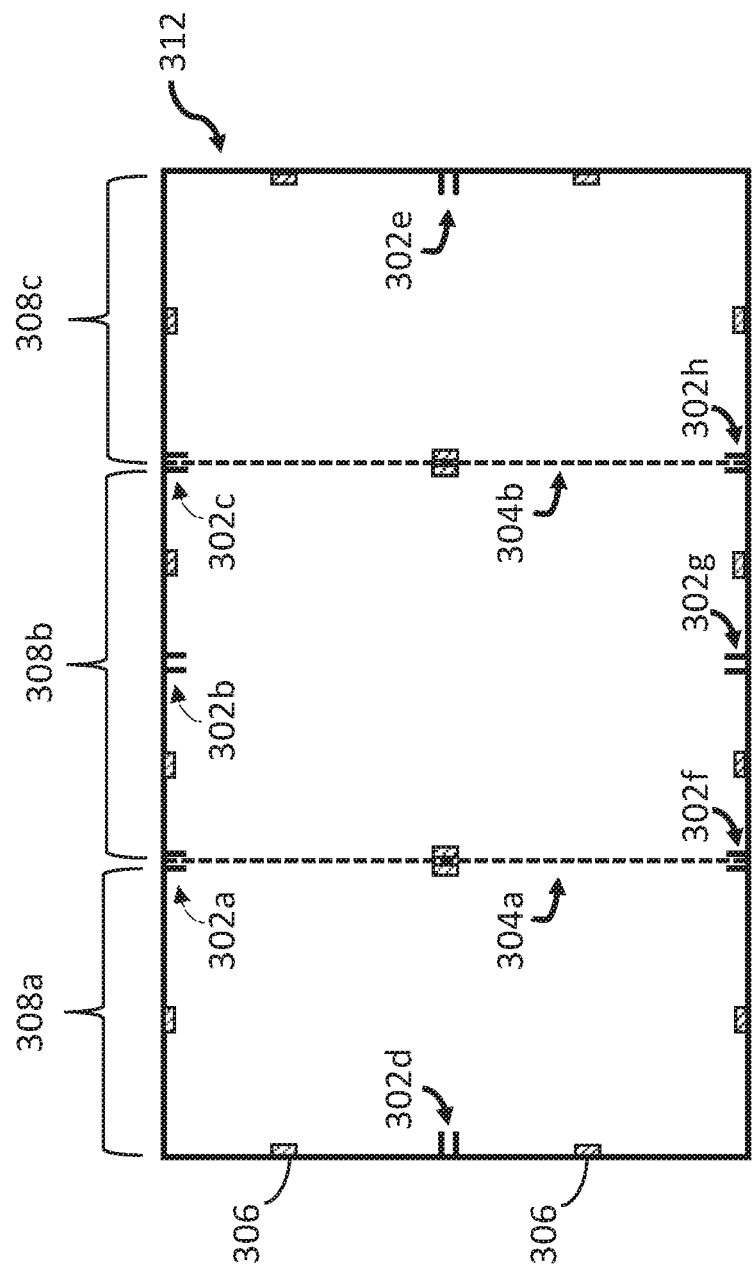
FIG. 3 is a diagram illustrating a top view of a delivery container including removable dividers, according to some embodiments of the disclosure.

FIG. 3 is a diagram 300 illustrating a top view of a delivery container 312 including sensors 306 and removable dividers 304a, 304b, according to various embodiments of the disclosure. The delivery container 312 includes slots 302a-302h for inserting removable dividers and segmenting the delivery container 312 into multiple compartments. As shown in FIG. 3, a first removable divider 304a is inserted into slots 302a, 302f and a second removable divider 304b is inserted into slots 302c, 302h. The placement of the first 304a and second 304b removable dividers divides the delivery container 312 into first 308a, second 308b, and third 308c compartments.

In other configurations, only one of the first 304a and second 304b removeable dividers is inserted into the delivery container 312, resulting in one smaller compartment (308a or 308c) and another larger compartment. In one configuration, one of the first 304a and second 304b removeable dividers is positioned in the center slots 302b, 302g, dividing the delivery container 312 in half. In another configuration, a third removeable divider (not shown) is added to the center slots 302b, 302g, dividing the second compartment 308b into 2 subcompartments. In another configuration, a longer removeable divider is placed between slots 302d, 302e, dividing the delivery container 312 in half lengthwise. In some implementations, the delivery compartment 312 is designed without slots, and removeable dividers are designed to be positioned in any selected locations within the delivery container 312.

The delivery container 312 includes multiple sensors 306. The sensors are positioned throughout the delivery container 312, including along the walls and floor of the delivery container 312. In some examples, the sensors 306 are positioned such that if the delivery container 312 is divided by removeable dividers (such as dividers 304a, 304b), any resulting compartments (such as compartments 308a, 308b, 308c) each include a sensors 306. When multiple different types of sensors 306 are included in the delivery container 312, as described above with respect to FIG. 2, each compartment includes multiple different types of sensors 306. In some examples, the removable dividers 304a, 304b include integrated sensors. Thus, when removeable dividers are added to the delivery container 312, additional sensors are also added, including sensors on the newly created compartment walls.

According to some implementations, the delivery container 312 includes a removeable liner. The removable liner can be replaced for each delivery, it can be replaced periodically, or it can be replaced when sensors indicate it has become dirty.

Figure 4:
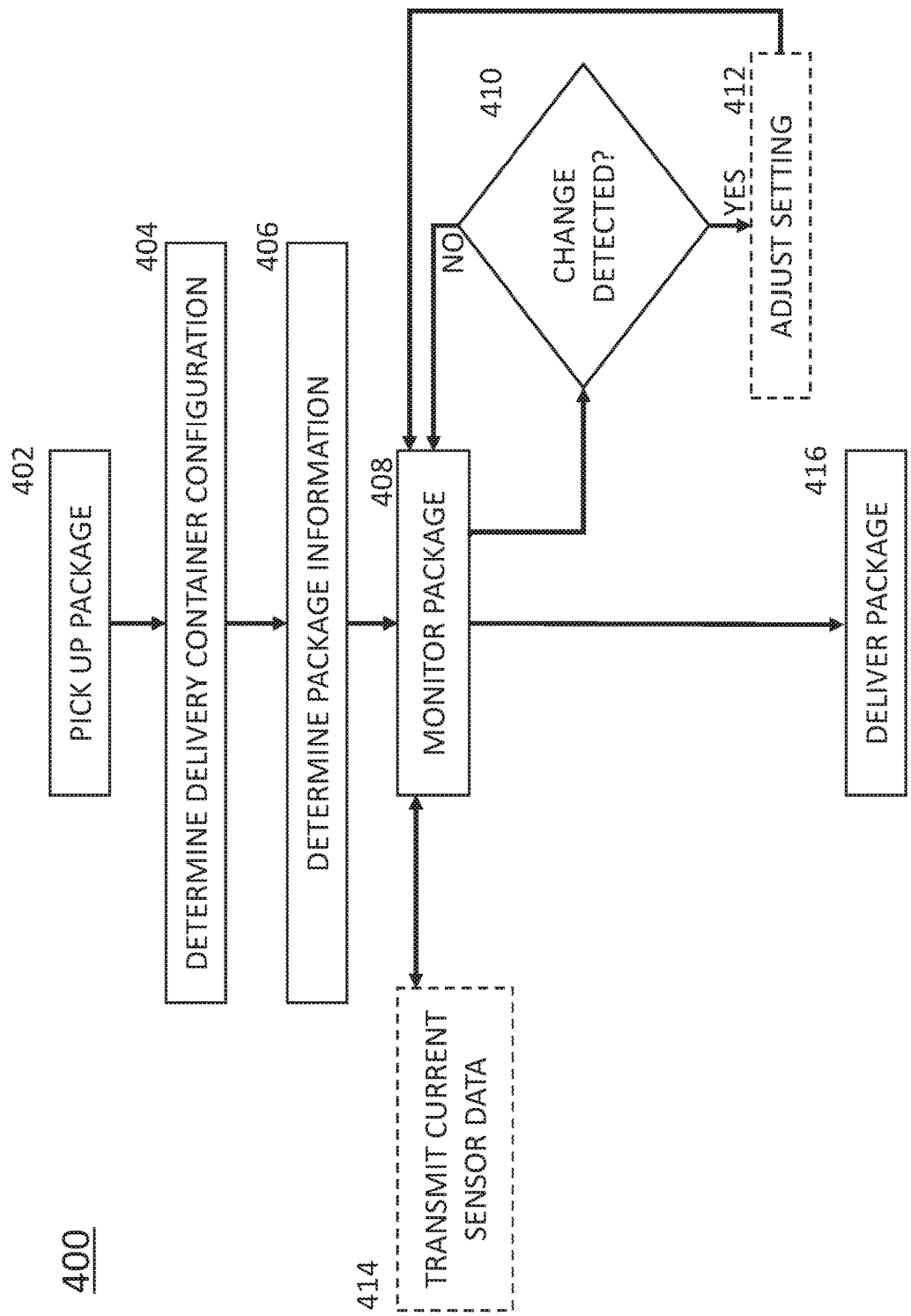
FIG. 4 is a flow chart showing a method for automatic vehicle delivery monitoring, according to some embodiments of the disclosure.

FIG. 4 is a flow chart showing a method 400 for automatic vehicle delivery monitoring, according to various embodiments of the disclosure. At step 402, a package is picked up by the autonomous vehicle. At step 404, the delivery container configuration is determined. In particular, it is determined whether the delivery container is divided into one or more compartments. At step 406, package information is determined. The sensors in the delivery container sense/detect the data the sensors are designed to sense. In one example, the sensors detect package temperature, package weight, and placement of the package in the delivery container. In some examples, the sensors identify objects inside the package. In some examples, the sensors begin capturing images and/or a video recording of the package.

At step 408, the package is monitored. The sensors continue to capture data while the package is transported between the pick-up location and the drop-off location. In various examples, one or more sensors continuously monitor the package. In some examples, one or more sensors periodically monitor the package. At step 410, it is determined whether there is a change in the data from the sensors. In some examples, sensor data is transmitted to a computer and the computer detects changes in sensor data. The computer can be a delivery container computer. In some examples, the computer is the autonomous vehicle onboard computer.

In various implementations, if there is a change in sensor data, a setting for the delivery container is adjusted. For example, if a sensed temperature changes, a temperature setting of the delivery container can be adjusted. If no change in the data from the sensors is detected at step 410, the package continues to be monitored at step 408. In some examples, if the sensors detect a spill or leakage, feedback can be provided to adjust driving behavior of the autonomous vehicle to prevent further spills. In further examples, if the sensors detect a smell in the delivery container, additional ventilation may be provided to the delivery container. The additional ventilation may be provided during and/or after delivery of the package.

At step 414, current sensor data for the package is transmitted. In some examples, current package data is transmitted from the local computer (e.g., a delivery container computer or an autonomous vehicle onboard computer) to a remote computer. The remote computer may then provide the sensor data for the package to a delivery service, as described in further detail with respect to FIG. 5. According to various implementation, a user may want to monitor the package while it is being transported from the pick-up location to the drop-off location. In some examples, the package order is placed through a website or application, and an update of package details is provided to a user through the website or application.

At step 416, the package is delivered at the drop-off location.

Figure 5:
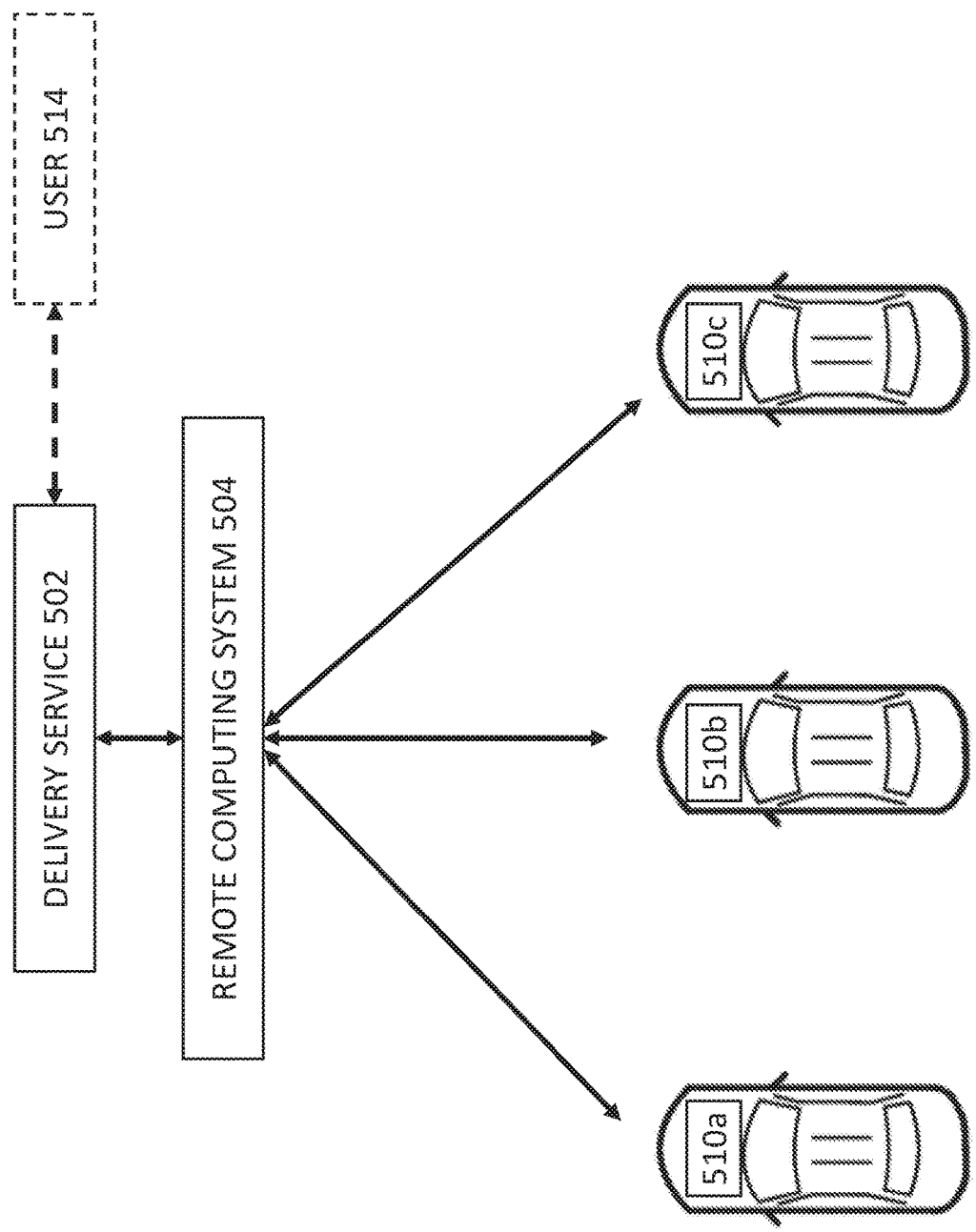
FIG. 5 is a diagram illustrating a fleet of vehicles in communication with a central computer, according to some embodiments of the disclosure.

FIG. 5 is a diagram illustrating a system 500 for package delivery, according to some embodiments of the disclosure. The system 500 includes a delivery service module 502, remote computing system 504, and an autonomous vehicle internal computing system 510a, 510b, 501c. The delivery service module 502 communicates a package delivery request to the remote computing system 504. The package delivery request identifies characteristics about the package. In some examples, the package delivery request identifies characteristics such as dimensions and weight of the package. In some examples, the package delivery request identifies the nature of the package, such as prepared food, perishable items, beverages, fragile items, paper goods, etc.

In some examples, the package delivery request is divided into multiple subparts and the package delivery request includes different characteristics for each subpart. For example, a package delivery request may be divided into a first subpart that includes a hot item and a second subpart that includes a cold item. In another example, a package delivery request may be divided into a first subpart that includes food items and a second subpart that includes non-food items.

The package delivery request generated by the delivery service module 502 also includes a package pick-up location and a package drop-off location. The remote computing system 504 receives the package delivery request from the delivery service module 502, and coordinates the selection of an autonomous vehicle from a fleet of autonomous vehicles for pick-up and delivery of the package. In some examples, the remote computing system 504 is a central computer. The remote computing system 504 communicates with the onboard computer 510a of the selected autonomous vehicle. The remote computing system 504 sends a pick-up location to the selected autonomous vehicle onboard computer 510a.

In some implementations, the remote computing system 504 includes a routing coordinator for planning a route for the selected autonomous vehicle, and the routing coordinator determines a route for the autonomous vehicle to travel from the autonomous vehicle's current location to the pick-up location, and from the pick-up location to the drop-off location. The remote computing system 504 sends the selected route to the autonomous vehicle. According to various implementations, the selected route is periodically updated. In some implementations, the remote computing system sends route plan information such as waypoints to the autonomous vehicle's onboard computer 510a for guiding the autonomous vehicle through an itinerary. The autonomous vehicle navigates to the waypoints until it arrives at the destination (the drop-off location). In some examples, upon arrival at the drop-off location, the autonomous vehicle onboard computer 510a send an arrival message to the remote computing system 504. The remote computing system 504 sends an arrival message to the delivery service 502.

While the selected vehicle 510a, 510b, 501c is transporting the package from the pick-up location to the drop-off location, sensors in the delivery compartment of the vehicle monitor the package. In various implementations, sensor data is transmitted from the selected vehicle 510a, 510b, 510c to the remote computing system 504. In some implementations, the remote computing system 504 transmits the sensor data to the delivery service 502. In some examples, the delivery service 502 transmits the sensor date to the user 514.

In some implementations, once the package arrives at the drop-off location, the autonomous vehicle onboard computer initiates a delivery verification system to collect evidence of delivery of the package, for example by using a camera on the autonomous vehicle to take a picture of the package at drop-off, and/or at its delivery location.

When the remote computing system 504 receives a package delivery request from a delivery service module 502, the remote computing system 504 sends the package delivery request information to the selected autonomous vehicle onboard computer 510a. In some implementations, the remote computing system 504 continues to schedule pick up of passengers around trips to drop off packages. In this way, idle time of autonomous vehicles can be minimized since the autonomous vehicles can continue to drop off packages when not utilized for passenger transport.

In some implementations, the delivery service module 502 receives delivery service requests from one or more users. In some examples, the delivery service module 502 receives delivery service requests from food vendors. In some examples, the delivery service module 502 receives delivery service requests from individual users. In some examples, delivery service requests are input to the delivery service module 502 via a mobile device application or a website.

In some implementations, autonomous vehicle delivery service is provided as part of a peer to peer delivery network. Users who want to send, deliver, or move packages on demand can access a peer-to-peer delivery network and connect to an autonomous vehicle delivery service to schedule pick-up and delivery of the package.

Figure 6:
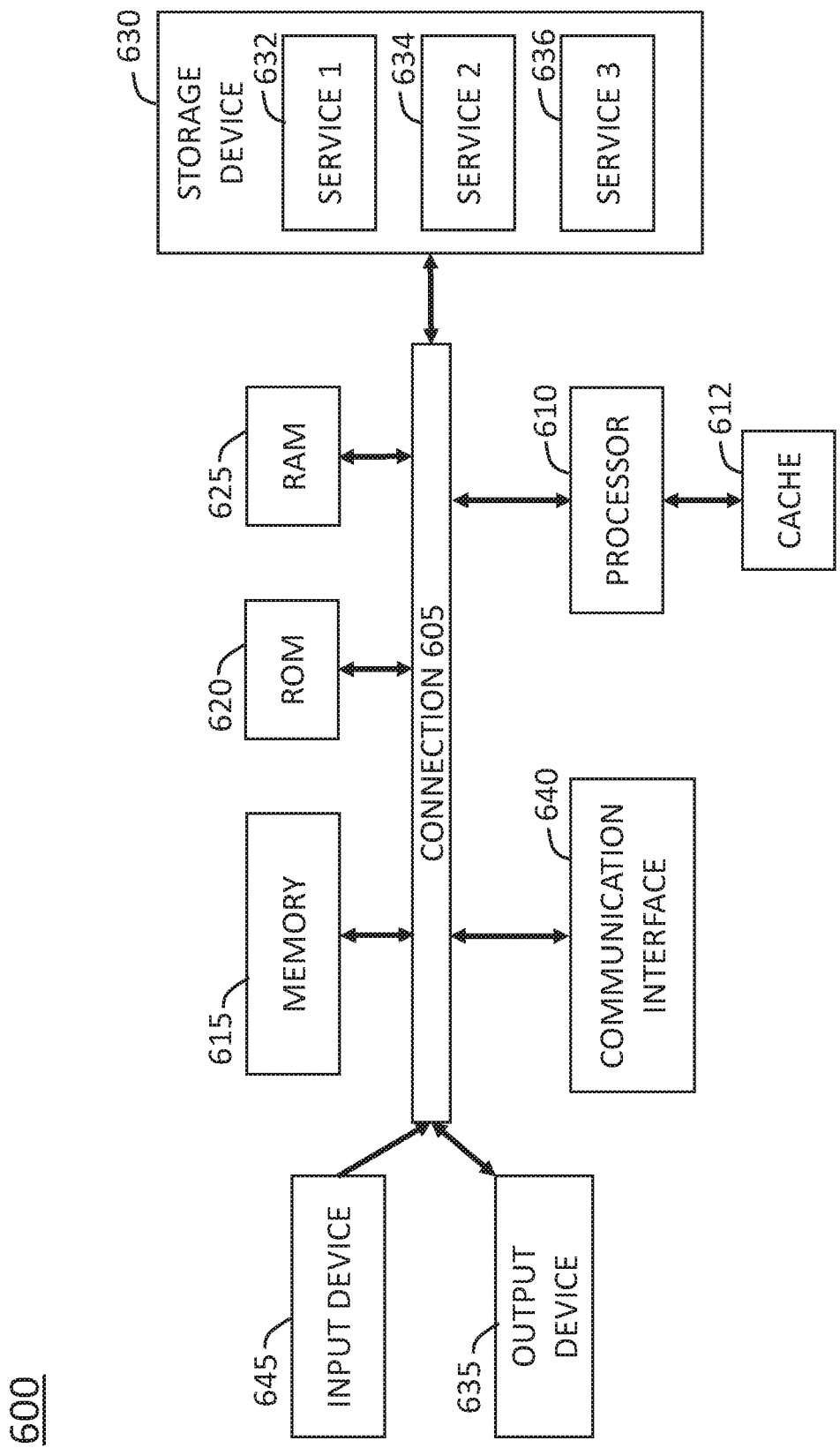
FIG. 6 shows an example embodiment of a system for implementing certain aspects of the present technology.

FIG. 6 shows an example embodiment of a computing system 600 for implementing certain aspects of the present technology. In various examples, the computing system 600 can be any computing device making up the onboard computer 104, the remote computing system 504, a device executing the delivery service 502, or any other computing system described herein. The computing system 600 can include any component of a computing system described herein which the components of the system are in communication with each other using connection 605. The connection 605 can be a physical connection via a bus, or a direct connection into processor 610, such as in a chipset architecture. The connection 605 can also be a virtual connection, networked connection, or logical connection.

In some implementations, the computing system 600 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

The example system 600 includes at least one processing unit (CPU or processor) 610 and a connection 605 that couples various system components including system memory 615, such as read-only memory (ROM) 620 and random access memory (RAM) 625 to processor 610. The computing system 600 can include a cache of high-speed memory 612 connected directly with, in close proximity to, or integrated as part of the processor 610.

The processor 610 can include any general-purpose processor and a hardware service or software service, such as services 632, 634, and 636 stored in storage device 630, configured to control the processor 610 as well as a special-purpose processor where software instructions are incorporated into the actual processor design. The processor 610 may essentially be a completely self-contained computing system, containing multiple cores or processors, a bus, memory controller, cache, etc. A multi-core processor may be symmetric or asymmetric.

To enable user interaction, the computing system 600 includes an input device 645, which can represent any number of input mechanisms, such as a microphone for speech, a touch-sensitive screen for gesture or graphical input, keyboard, mouse, motion input, speech, etc. The computing system 600 can also include an output device 635, which can be one or more of a number of output mechanisms known to those of skill in the art. In some instances, multimodal systems can enable a user to provide multiple types of input/output to communicate with the computing system 600. The computing system 600 can include a communications interface 640, which can generally govern and manage the user input and system output. There is no restriction on operating on any particular hardware arrangement, and therefore the basic features here may easily be substituted for improved hardware or firmware arrangements as they are developed.

A storage device 630 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 630 can include software services, servers, services, etc., that when the code that defines such software is executed by the processor 610, it causes the system to perform a function. In some embodiments, a hardware service that performs a particular function can include the software component stored in a computer-readable medium in connection with the necessary hardware components, such as a processor 610, a connection 605, an output device 635, etc., to carry out the function.

As discussed above, each vehicle in a fleet of vehicles communicates with a routing coordinator. When a vehicle is flagged for service, the routing coordinator schedules the vehicle for service and routes the vehicle to the service center. When the vehicle is flagged for maintenance, a level of importance or immediacy of the service can be included. As such, service with a low level of immediacy will be scheduled at a convenient time for the vehicle and for the fleet of vehicles to minimize vehicle downtime and to minimize the number of vehicles removed from service at any given time. In some examples, the service is performed as part of a regularly-scheduled service. Service with a high level of immediacy may require removing vehicles from service despite an active need for the vehicles. In some examples, sensor data indicates that the delivery container needs cleaning, and the vehicle is flagged for service before it performs any further deliveries.

In some implementations, a package delivery request is assigned a lower level of importance than a passenger ride request. In one example, a package delivery request for same day delivery of goods which has a wide delivery time window is assigned a lower level of importance than a passenger ride request. In some implementations, a package delivery request is assigned the same level of importance as a passenger ride request. In some implementations, a package delivery request is assigned a higher level of importance than a passenger ride request. In one example, a package delivery request is for quick delivery of freshly prepared food and is assigned a high level of importance. In another example, a package delivery request is for delivery of biological materials. Similarly, a package delivery request for delivery of biological materials is assigned a high level of importance.

Routing goals may be specific or general in terms of both the vehicles they are applied to and over what timeframe they are applied. As an example of routing goal specificity in vehicles, a routing goal may apply only to a specific vehicle, or to all vehicles of a specific type, etc. Routing goal timeframe may affect both when the goal is applied (e.g., urgency of the goal, or, some goals may be 'active' only during set times) and how the goal is evaluated (e.g., for a longer-term goal, it may be acceptable to make some decisions that do not optimize for the goal in the short term, but may aid the goal in the long term). Likewise, routing vehicle specificity may also affect how the goal is evaluated; e.g., decisions not optimizing for a goal may be acceptable for some vehicles if the decisions aid optimization of the goal across an entire fleet of vehicles.

In various implementations, the routing coordinator is a remote server or a distributed computing system connected to the autonomous vehicles via an internet connection. In some implementations, the routing coordinator is any suitable computing system. In some examples, the routing coordinator is a collection of autonomous vehicle computers working as a distributed system.

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

Select Examples

Example 1 provides a method for monitoring packages in autonomous vehicle delivery, including picking up a package in an autonomous vehicle delivery container, determining, by a first plurality of sensors, a configuration of the AV delivery container, determining, by a second plurality of sensors, a set of attributes for the package, monitoring the package to detect whether a change occurs in at least one of the set of attributes, and transporting the package to a drop-off location.

Example 2 provides a method according to example 1, including transmitting the set of attributes to a central computer.

Example 3 provides a method according to one or more of the preceding examples, wherein transmitting the set of attributes to a central computer includes transmitting a livestream of the set of attributes.

Example 4 provides a method according to one or more of the preceding examples including transmitting the set of attributes to a user.

Example 5 provides a method according to one or more of the preceding examples wherein the set of attributes includes at least one of dimensions, weight, temperature, and appearance.

Example 6 provides a method according to one or more of the preceding examples including adjusting a delivery container setting based on the change.

Example 7 provides a method according to one or more of the preceding examples including receiving a package delivery request from a peer-to-peer delivery system.

Example 8 provides a method according to one or more of the preceding examples including providing a streaming video of the package to a central computer.

Example 9 provides a method according to one or more of the preceding examples including identifying goods in the package based, at least in part, on the set of attributes Example 10 provides system for monitoring in autonomous vehicle delivery, comprising: a plurality of autonomous vehicles each having a respective delivery container, and a remote computing system configured to receive a package delivery request and select an autonomous vehicle from the plurality of autonomous vehicles to fulfill the package delivery request. Each of the plurality of autonomous vehicles includes a respective delivery container having a plurality of sensors and is configured to determine, by the plurality of sensors, a configuration of the respective delivery container, determine, by the plurality of sensors, a set of attributes for the package, and monitor the package to detect whether a change occurs in at least one of the set of attributes.

Example 11 provides a system according to one or more of the preceding examples where the configuration determined by first plurality of sensors includes a number of compartments in the respective delivery container.

Example 12 provides a system according to one or more of the preceding examples where the plurality of sensors includes at least one of a temperature sensor, a liquid sensor, and an image sensor.

Example 13 provides a system according to one or more of the preceding examples where each of the plurality of autonomous vehicles is configured to transmit the set of attributes to the remote computing system.

Example 14 provides a system according to one or more of the preceding examples where the plurality of sensors includes an image sensor and the set of attributes includes a video of the package.

Example 15 an autonomous vehicle delivery system, comprising a delivery container configured to hold a package, a plurality of sensors positioned in the delivery container for detecting a set of attributes for the package, a transceiver for receiving the set of attributes from the plurality of sensors and for transmitting the set of attributes, and a processor for detecting changes in the set of attributes over time.

Example 16 provides a system according to one or more of the preceding examples where the set of sensors includes at least one of a temperature sensor, a liquid sensor, and an image sensor.

Example 17 provides a system according to one or more of the preceding examples where the set of attributes includes a video of an interior of the delivery container.

Example 18 provides a system according to one or more of the preceding examples where the set of attributes includes at least one of dimensions, weight, temperature, and appearance.

Example 19 provides a system according to one or more of the preceding examples where the plurality of sensors determines a configuration of the delivery container.

Example 20 provides a system according to one or more of the preceding examples where the set of attributes are transmitted to a remote computer system.

Variations and Implementations

According to various examples, driving behavior includes any information relating to how an autonomous vehicle drives. For example, driving behavior includes how and when the autonomous vehicle actuates its brakes and its accelerator, and how it steers. In particular, the autonomous vehicle is given a set of instructions (e.g., a route or plan), and the driving behavior determines how the set of instructions is implemented to drive the car to and from various destinations, and, potentially, to stop for passengers or items. Driving behavior may include a description of a controlled operation and movement of an autonomous vehicle and the manner in which the autonomous vehicle applies traffic rules during one or more driving sessions. Driving behavior may additionally or alternatively include any information about how an autonomous vehicle calculates routes (e.g., prioritizing fastest time vs. shortest distance), other autonomous vehicle actuation behavior (e.g., actuation of lights, windshield wipers, traction control settings, etc.) and/or how an autonomous vehicle responds to environmental stimulus (e.g., how an autonomous vehicle behaves if it is raining, or if an animal jumps in front of the vehicle). Some examples of elements that may contribute to driving behavior include acceleration constraints, deceleration constraints, speed constraints, steering constraints, suspension settings, routing preferences (e.g., scenic routes, faster routes, no highways), lighting preferences, "legal ambiguity" conduct (e.g., in a solid-green left turn situation, whether a vehicle pulls out into the intersection or waits at the intersection line), action profiles (e.g., how a vehicle turns, changes lanes, or performs a driving maneuver), and action frequency constraints (e.g., how often a vehicle changes lanes).

As will be appreciated by one skilled in the art, aspects of the present disclosure, in particular aspects of a perception system for an autonomous vehicle, described herein, may be embodied in various manners (e.g., as a method, a system, a computer program product, or a computer-readable storage medium). Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Functions described in this disclosure may be implemented as an algorithm executed by one or more hardware processing units, e.g. one or more microprocessors, of one or more computers. In various embodiments, different steps and portions of the steps of each of the methods described herein may be performed by different processing units. Furthermore, aspects of the present disclosure may take the form of a computer program product embodied in one or more computer readable medium(s), preferably non-transitory, having computer readable program code embodied, e.g., stored, thereon. In various embodiments, such a computer program may, for example, be downloaded (updated) to the existing devices and systems (e.g. to the existing perception system devices and/or their controllers, etc.) or be stored upon manufacturing of these devices and systems.

The following detailed description presents various descriptions of specific certain embodiments. However, the innovations described herein can be embodied in a multitude of different ways, for example, as defined and covered by the claims and/or select examples. In the following description, reference is made to the drawings where like reference numerals can indicate identical or functionally similar elements. It will be understood that elements illustrated in the drawings are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

The preceding disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will of course be appreciated that in the development of any actual embodiment, numerous implementation-specific decisions must be made to achieve the developer's specific goals, including compliance with system, business, and/or legal constraints, which may vary from one implementation to another. Moreover, it will be appreciated that, while such a development effort might be complex and time-consuming; it would nevertheless be a routine undertaking for those of ordinary skill in the art having the benefit of this disclosure.

In the Specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above", "below", "upper", "lower", "top", "bottom", or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction. When used to describe a range of dimensions or other characteristics (e.g., time, pressure, temperature, length, width, etc.) of an element, operations, and/or conditions, the phrase "between X and Y" represents a range that includes X and Y.

Other features and advantages of the disclosure will be apparent from the description and the claims. Note that all optional features of the apparatus described above may also be implemented with respect to the method or process described herein and specifics in the examples may be used anywhere in one or more embodiments.

The 'means for' in these instances (above) can include (but is not limited to) using any suitable component discussed herein, along with any suitable software, circuitry, hub, computer code, logic, algorithms, hardware, controller, interface, link, bus, communication pathway, etc. In a second example, the system includes memory that further comprises machine-readable instructions that when executed cause the system to perform any of the activities discussed above.

What is claimed is:

1. A method for monitoring packages in autonomous vehicle delivery, comprising:
   dividing a delivery container in an autonomous vehicle into a plurality of compartments using at least one removable divider;
   picking up a package in one of the plurality of compartments of the delivery container;
   determining, by the autonomous vehicle using a first plurality of sensors, a configuration of the delivery container including a number of the plurality of compartments and a size of each of the plurality of compartments;
   determining, by the autonomous vehicle using a second plurality of sensors, a set of attributes for the package, wherein the second plurality of sensors includes a liquid sensor, and wherein the liquid sensor is integrated into the at least one removable divider;
   monitoring the package to detect whether a change occurs in at least one of the set of attributes, wherein detecting whether the change occurs includes detecting leakage at the liquid sensor;
   based on detected leakage at the liquid sensor, adjusting driving behavior of the autonomous vehicle to prevent further spills; and
   transporting the package to a drop-off location.

2. The method of claim 1, further comprising transmitting the set of attributes to a central computer.

3. The method of claim 2, wherein transmitting the set of attributes to the central computer includes transmitting a livestream of the set of attributes.

4. The method of claim 1, further comprising transmitting the set of attributes to a user, wherein the set of attributes includes at least one of dimensions, weight, temperature, and appearance.

5. The method of claim 1, further comprising receiving a package delivery request from a peer-to-peer delivery system.

6. The method of claim 1, further comprising providing a streaming video of the package to a central computer.

7. The method of claim 1, further comprising flagging the autonomous vehicle delivery container for cleaning based on detecting leakage.

8. The method of claim 1, further comprising detecting a smell in the delivery container and providing additional ventilation to the delivery container.

9. The method of claim 1, wherein determining the configuration includes determining, by the autonomous vehicle, a number of delivery container compartments.

10. A system for monitoring in autonomous vehicle delivery, comprising:
    a plurality of autonomous vehicles each having a respective delivery container; and
    a remote computing system configured to:
       receive a package delivery request; and
       select an autonomous vehicle from the plurality of autonomous vehicles to fulfill the package delivery request;
    wherein each of the plurality of autonomous vehicles includes a respective delivery container divided into a plurality of compartments by at least one removable divider, and having a plurality of sensors including a liquid sensor integrated into the at least one removable divider, and wherein each of the plurality of autonomous vehicles is configured to:

determine, by the plurality of sensors, a configuration of the respective delivery container including a number of the plurality of compartments and a size of each of the plurality of compartments;

determine, by the plurality of sensors, a set of attributes for the package;

monitor the package to detect whether a change occurs in at least one of the set of attributes, wherein detecting whether the change occurs includes detecting leakage from the package by the liquid sensor; and based on detected leakage, adjusting driving behavior of the respective autonomous vehicle to prevent further spills.

11. The system of claim 10, wherein each of the plurality of autonomous vehicles is configured to transmit the set of attributes to the remote computing system.

12. The system of claim 11, wherein the plurality of sensors includes an image sensor and the set of attributes includes a video of the package.

13. The system of claim 10, wherein the at least one removeable divider in each of the plurality of autonomous vehicles includes one of an integrated chemical sensor and an integrated x-ray sensor.

14. An autonomous vehicle delivery system, comprising
a delivery container in an autonomous vehicle configured to hold a package;
a removeable divider to divide the delivery container into a plurality of compartments, and
a plurality of sensors, including a liquid sensor integrated into the removable divider, wherein the plurality of sensors are positioned in the delivery container and configured to determine a configuration of the delivery container including a number of the plurality of compartments and a size of each of the plurality of compartments, and further configured to detect a set of attributes for the package;
a transceiver for receiving the set of attributes from the plurality of sensors and for transmitting the set of attributes; and
a processor for detecting changes in the set of attributes over time, wherein detecting changes includes detecting leakage from the package;
wherein, based on detected leakage, the autonomous vehicle is configured to adjust autonomous vehicle driving behavior to prevent further spills.

15. The autonomous vehicle delivery system of claim 14, wherein the set of attributes includes a video of the package.

16. The autonomous vehicle delivery system of claim 14, wherein the set of attributes are transmitted to a remote computer system.

17. The autonomous vehicle delivery system of claim 14, wherein the delivery container includes a removeable liner.

18. The autonomous vehicle delivery system of claim 14, wherein the transceiver is further configured to transmit a vehicle cleaning request when leakage is detected.

19. The autonomous vehicle delivery system of claim 14, further comprising one of a chemical sensor and an x-ray sensor integrated into the removeable divider.

20. The autonomous vehicle delivery system of claim 14, wherein the liquid sensor is to sense liquid in at least one of the plurality of compartments.

* * * * *